United States Patent
Hagen et al.

(10) Patent No.: US 7,312,295 B2
(45) Date of Patent: Dec. 25, 2007

(54) COPOLYMERS OF ETHYLENE AND 1-HEPTENE

(75) Inventors: Hendrik H. Hagen, Terneuzen (NL); Lambertus P. P. M. Van Der Heijden, Terneuzen (NL)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/553,766

(22) PCT Filed: Mar. 12, 2004

(86) PCT No.: PCT/US2004/007595

§ 371 (c)(1), (2), (4) Date: Aug. 24, 2006

(87) PCT Pub. No.: WO2004/096874

PCT Pub. Date: Nov. 11, 2004

(65) Prior Publication Data

US 2007/0037949 A1    Feb. 15, 2007

Related U.S. Application Data

(60) Provisional application No. 60/465,133, filed on Apr. 24, 2003.

(51) Int. Cl.
*C08F 210/14* (2006.01)
*C08F 210/16* (2006.01)

(52) U.S. Cl. ................................. 526/348.1; 526/348.2

(58) Field of Classification Search ............. 526/348.1, 526/348.2

See application file for complete search history.

(56) References Cited

U.S. PATENT DOCUMENTS 5,595,705 A * 1/1997 Walton et al. ............... 264/456

* cited by examiner

*Primary Examiner*—Roberto Rabago

(57) ABSTRACT

The present invention relates to a copolymer comprising units derived from ethylene and 1-heptene, to a composition comprising such a copolymer, and to an article prepared from or containing such a copolymer.

12 Claims, No Drawings

COPOLYMERS OF ETHYLENE AND 1-HEPTENE

This application claims the benefit of U.S. Provisional Application 60/465,133, filed Apr. 24, 2003.

FIELD OF THE INVENTION

The present invention relates to copolymers of ethylene and 1-heptene, to compositions comprising such copolymers, and to articles of manufacture such as films which are made from such copolymers and compositions thereof.

BACKGROUND OF THE INVENTION

Copolymers of ethylene and an alpha-olefin comonomer produced by polymerization processes using coordination catalysts have become very successful over the last two decades because of their excellent physical, chemical, and processing properties. These copolymers have linear backbones with short chain branches resulting from the comonomer incorporated in the polymer backbone. Using certain types of catalysts and processing conditions linear backbone copolymers may be produced which in addition contain long chain branches. For the purposes of the present application all of these copolymers will be referred to as linear low density polyethylenes (LLDPE). LLDPE's have been used for a wide variety of applications using different melt processing techniques, such as blow molding, cast molding, injection molding, rotational molding, thermoforming, to produce articles of manufacture such as films, bottles, pipe, tubing, and wire and cable coating applications and derived products. Because of their excellent physical properties and processing characteristics LLDPE films are well suited for a broad spectrum of applications. Fabrication of LLDPE film is generally effected by blown film or slot casting processes. The resulting film is characterized by good physical properties such as tensile strength, high ultimate elongation, and impact strength. In particular, ethylene copolymers containing the higher alpha-olefin comonomer 1-octene are widely recognized for their excellent physical properties.

LLDPE films are useful in the packaging of frozen foods and in display packaging and require for these applications polymer compositions that are capable of shielding often irregularly shaped objects from the environment, without tearing or rupturing, and in general while maintaining good optics. An improvement of mechanical properties per unit film thickness would allow the reduction of the thickness of the films used, and thus the costs of the packaging materials. The resistance to tearing or rupturing could be improved by lowering the density of the LLDPE, but this leads to a shift in the balance between several mechanical properties, such as puncture resistance and tensile strength. Furthermore, more comonomer is required to lower the density, which would result in higher production costs. In addition, lower density LLDPE's generally have higher amounts of soluble materials which can come into contact with the articles to be packaged, such as foods. EP 1 231 228 A1 (Joubert et al) describes a process for producing co- and terpolymers of ethylene and linear alpha olefins having more than 5 carbon atoms wherein ethylene or the linear alpha olefin component is Fischer-Tropsch derived so that it includes other olefinic components. According to EP 1 231 228 A1, such polymers have a wide range of fundamental properties which are attributed by the inventors to the small amounts of other olefins present in the Fischer-Tropsch derived linear alpha olefin component which previously had been considered to be impurities. In Example 12 of EP 1 231 228 A1 a process for producing an ethylene/1-heptene copolymer is disclosed, in which the 1-heptene is derived by a Fischer-Tropsch process.

There is a continued need for materials suitable for making films that are capable of packaging or protecting objects, which are often irregularly shaped, from the environment, without tearing or rupturing, and in general while maintaining good optical properties.

SUMMARY OF THE INVENTION

The present invention relates to a copolymer comprising units derived from ethylene and 1-heptene wherein the peak force at break per millimeter of film thickness P of a blown film made of the copolymer satisfies the following relationship:

$$P > 1.9C - 127 \tag{1}$$

wherein P is expressed in N/mm and determined on a 50 micrometer thick blown film according to ASTM-D5748-95; and C is given by the relationship $C = D(1-CFW)$, wherein D is the density of the copolymer measured in kg/m$^3$ according to ASTM-D-792 and CFW is the weight fraction of the copolymer having a crystallization point of 75° C. or higher as determined using crystallization analysis fractionation, and C is greater than or equal to 550.

The present invention also relates to compositions comprising such copolymers, and to articles of manufacture such as films which are made from such copolymers and compositions thereof.

DETAILED DESCRIPTION OF THE INVENTION

The present invention relates to copolymers comprising units derived from ethylene and 1-heptene wherein the peak force at break per millimeter of film thickness, P, of the copolymer satisfies the relationship:

$$P > 1.9C - 127 \tag{1}$$

P is expressed in N/mm and determined on a 50 micrometer thick blown film made of the copolymer. The film thickness is measured as described in ASTM-D5748-95.

The peak force at break is determined according to ASTM-D5748-95, with the modification that the TFE-fluorocarbon coated pear shaped probe of ASTM D5748-95 is replaced by a 12.5 mm diameter stainless steel spherical probe. The resulting value of the peak force at break in N is then divided by the film thickness in mm as measured according to the method described in ASTM-D5748-95 to give the value of P in N/mm.

The 50 micrometer thick blown film is produced by extrusion on a Davo 45 mm blown film line using an LLDPE die of 90 mm diameter and 1.2 mm gap, operating at a maximum blow up ratio of 1:2.8 and with a single extrusion screw, the screw compression ratio being 1:1.4. The copolymer is typically stabilized.

In a preferred embodiment P also satisfies the relationship:

$$P > 2.7C - 563 \tag{1a}$$

wherein P and C in formula (1a) have the same meanings as in formula (1) above.

In a more preferred embodiment P also satisfies the relationship:

$$P > 3.4C - 944 \quad (1b)$$

wherein P and C have the same meanings as in formula (1) above.

In the relationship of formula 1, 1a, and 1b, C equals D*(1-CFW), on the condition that C is greater than or equal to 550.

CFW is the weight fraction of the copolymer having a crystallization point of 75° C. or higher as determined by using crystallization analysis fractionation, wherein the crystallization analysis fractionation comprises the steps of a) dissolving a sample (typically about 30 mg) of the copolymer in 1,2,4-trichlorobenzene solvent (typically about 30 mL), typically in the presence of a stabilizer, for example 0.25 g/L butylated hydroxytoluene, for 30 minutes at 150° C. while stirring (typically at 200 rpm), b) cooling the resulting copolymer solution from 150° C. to 95° C. at a rate of 30° C. per minute, typically followed by reducing the rate of stirring to, for example 100 rpm, c) maintaining the copolymer solution at 95° C. for 45 minutes, d) further cooling the copolymer mixture from 95° C. to 30° C. at a rate of 0.2° C. per minute and drawing aliquots from the copolymer solution, e) analyzing the aliquots to determine the relative amount of dissolved copolymer therein wherein the amount of copolymer dissolved at 95° C. is set to 1, and f) determining the relative amount of the copolymer in solution at 75° C., $W_{75}$, and determining CFW by using the equation:

$$CFW = (1 - W_{75})$$

The method can conveniently be carried out in a Polychar 200 CRYSTAF analyzer (available from Polymer Characterization S.A. "Polymer ChAR", Paterna, Spain). On this analyzer the following machine settings were used:
a) The Infra Red detector temperature is 140° C.
b) The polymer in solution is measured by determining the absorption at wave numbers 3.5 micrometers (2857 cm$^{-1}$) and 3.6 micrometers (2778 cm$^{-1}$) to compensate for any drift during analysis time.
c) Aliquots, typically about 36, are automatically drawn from the copolymer solution by the analyzer at regular intervals during the crystallization analysis fractionation. After about 25 seconds from withdrawing an aliquot, infra-red readings are taken.
d) The measured data points are plotted as the percentage weight fraction of copolymer in solution against the temperature of the copolymer solution. A curve is fitted through the data points using the smoothing parameter set to 0.1 for temperatures greater than 70° C., and the smoothing parameter set to 0.3 for temperatures less than 70° C.

The method of crystallization analysis fractionation is also described in U.S. Pat. No. 5,222,390, which is incorporated by reference herein. The weight fraction of sample that has not crystallized during this crystallization fractionation procedure after cooling down to 30° C. is called the soluble fraction.

The density D is measured on compression molded plaques as specified in ASTM-D-1238 Procedure A, Condition E.

Due to the lower boiling point of the 1-heptene comonomer in comparison to an 1-octene comonomer, the copolymers will have a lower amount of residual volatiles that may be left in the copolymer after the finishing steps in the polymerization process compared to copolymers of 1-octene, which is beneficial when used in food-contact applications.

In a further preferred embodiment of the present invention the density D of the copolymer is from 890 to 935 kg/m$^3$ and the melt index as measured according to ASTM-D-1238 Procedure A, Condition E at 190° C./2.16 kg is from 0.3 to 25 g/10 min. More preferably the density D is from 895 to 930 kg/m$^3$, very desirably from 901 to 928 kg/m$^3$, and most preferably the density D is from 916 to 924 kg/m$^3$. The melt index of the copolymer is preferably from 0.5 to 10 g/10 min, most preferably from 0.5 to 3.0 g/10 min. In yet another preferred embodiment the fraction CFW of the copolymer is from 0 to 0.5.

The copolymers comprising units derived from ethylene and 1-heptene of the present invention preferably have a melting peak in the range of 70 to 130° C., more preferably 90° C. to 125° C., as determined by differential scanning calorimetry. The copolymers of the invention preferably have a soluble fraction as determined by crystallization analysis fractionation as described above of less than 30%, more preferably less than 21%.

The copolymers of the present invention preferably have a number average molecular weight range of 18,000 to 100,000 g/mole, preferably 25,000 to 50,000 g/mole. The molecular weight distribution of the present copolymers is not critical but desirably is between 1.8 and 15, more preferably between 2 and 5.

The copolymers comprising units derived from ethylene and 1-heptene of the present invention can be obtained by copolymerizing ethylene and 1-heptene under specific conditions. The copolymers of the present invention preferably comprise 89-99.5 mole percent of units derived from ethylene and 0.5-11 mole percent of units derived from 1-heptene, and optionally 0-1.5 mole percent of units derived from an additional comonomer. More preferably, the copolymer consists of 0.9-9.2 mole percent of units derived from heptene-1 and most preferably 1.1-8.1 mole percent of units derived from 1-heptene, the remainder being units derived from ethylene. In the preparation of the copolymers of the present invention, small amounts of other alpha-olefins or other carbon-carbon unsaturated copolymerizable hydrocarbon comonomers in addition to ethylene and 1-heptene may be copolymerized. Examples of such alpha-olefins include alpha-olefins having from 3 to 18 carbon atoms, such as for example propylene, 1-butene, 1-hexene, 4-methyl-1-pentene, 3-methyl-1-pentene, 1-octene, 1-nonene, 1-decene, 1-undecene and 1-dodecene. The maximum amounts of additional comonomer are such that the copolymer satisfies the relationship given by formulae 1, 1a, or 1b. Preferably the small amount of other alpha-olefins or unsaturated comonomers which are not units derived from 1-heptene in the copolymer is less than 1.5 mole percent, more preferably less than 1 mole percent, and most preferably less than 0.4 mole percent.

The 1-heptene for use in the copolymers of the present invention can be produced using a number of methods. Such methods include selective hydrogenation of 1-heptane, dehydration of 1-heptanol, phase-transfer dehydrohalogenation of 1,2-dichloroheptane in the presence of a crown ether catalyst; chlorination-dechlorination of 1-heptane; pyrolysis of 1-heptyl lithium, deoxygenation of 1,2-heptandiol; thermal cracking and separation of alkanes, preferably the thermal cracking and separation of linear alkanes, most preferably the thermal cracking of $C_{18}$-$C_{26}$ linear alkanes; catalytic dehydogenation of alkanes; oligomerization of lower alkanes, and reaction of synthesis gas mixtures. In a preferred method the 1-heptene is produced by a Fischer-Tropsch process in which the 1-heptene is obtained by reacting a synthesis gas comprising carbon monoxide and hydrogen in the presence of a suitable Fischer-Tropsch catalyst, which is normally a catalyst comprising cobalt or iron or both cobalt and iron, whereby the reaction usually takes place in at elevated temperature in a suitable reactor such as a slurry bed or fixed-bed reactor, the products from which must usually be separated to obtain 1-heptene.

The present inventors believe, without wishing to be bound by any theory, that the advantageous properties of the copolymers of the present invention are due to the use of 1-heptene as comonomer and due to the use of a continuous solution polymerization process in combination with certain high efficiency catalysts.

The copolymers of the present invention are preferably prepared in a solution polymerization process. In such a solution polymerization process ethylene and 1-heptene, and optionally small amounts of other alpha-olefins or other comonomers are polymerized in the presence of an inert hydrocarbon solvent at a polymerization temperature above the softening point and preferably above the melting point of the resulting polymer. Typically the polymerization temperatures are in the range from 80° C. to 300° C., preferably from 100 to 300° C., most preferably from 130 to 275° C. The polymerization pressure typically is from 10 to 500 bar. Inert hydrocarbons diluents to be used in the solution polymerization techniques are those that are liquid under polymerization conditions, and include aliphatic, cycloaliphatic and aromatic hydrocarbons. Examples of aliphatic hydrocarbons include butane, pentane, hexane, cyclohexane, heptane, octane, isooctane, nonane, decane, dodecane, and mixtures thereof. Examples of cycloaliphatic hydrocarbons such as cyclopentane, cyclohexane, cycloheptane and cyclooctane and substituted derivatives thereof such as e.g. methylcyclopentane, and methylcyclohexane. Examples of aromatic hydrocarbons include benzene, toluene and xylene and halogenated derivatives thereof such as chlorobenzene. Hydrogen or other chain transfer agents and polymerization temperature are typically used for controlling molecular weight of the olefin polymer.

Preferred catalysts suitable for preparing the copolymers of the present invention include high efficiency Ziegler-Natta catalysts comprising as essential components titanium, halogen, aluminum and magnesium. Other preferred catalysts are so-called single site catalyst system, for example, transition metal compounds containing an anionic, delocalized, π-bonded group.

Typical examples of such anionic, delocalized, π-bonded group include cyclopentadienyl ligands which include cyclopentadienyl, pentamethylcyclopentadienyl, tetramethylcyclopentadienyl, tetramethyl(trimethylsilyl)-cyclopentadienyl, indenyl, 2,3-dimethylindenyl, fluorenyl, 2-methylindenyl, 2-methyl-4-phenylindenyl, tetrahydrofluorenyl, octahydrofluorenyl, and tetrahydroindenyl.

A preferred class of catalysts are transition metal complexes corresponding to the formula:

$Lp_lMX_mX'_nX''_p$, or a dimer thereof wherein:
Lp is an anionic, delocalized, π-bonded group that is bound to M, containing up to 50 non-hydrogen atoms, optionally two Lp groups may be joined together forming a bridged structure, and further optionally one Lp may be bound to X; M is a metal of Group 4 of the Periodic Table of the Elements in the +2, +3 or +4 formal oxidation state; X is an optional, divalent group of up to 50 non-hydrogen atoms that together with Lp forms a metallocycle with M; X' is an optional neutral ligand having up to 20 non-hydrogen atoms; X'' each occurrence is a monovalent, anionic moiety having up to 40 non-hydrogen atoms, optionally, two X'' groups may be covalently bound together forming a divalent dianionic moiety having both valences bound to M, or, optionally 2 X' groups may be covalently bound together to form a neutral, conjugated or nonconjugated diene that is π-bonded to M (whereupon M is in the +2 oxidation state), or further optionally one or more X'' and one or more X' groups may be bonded together thereby forming a moiety that is both covalently bound to M and coordinated thereto by means of Lewis base functionality; l is 0, 1 or 2, and most preferably 2; m is 0 or 1; n is a number from 0 to 3; p is an integer from 0 to 3; and the sum, l+m+p, is equal to the formal oxidation state of M, except when 2 X'' groups together form a neutral conjugated or non-conjugated diene that is π-bonded to M, in which case the sum l+m is equal to the formal oxidation state of M.

More preferred complexes include those containing either one or two Lp groups. The latter complexes containing two Lp groups, and especially two cyclopentadienyl derived groups, include those containing a bridging group linking the two Lp groups. Preferred bridging groups are those corresponding to the formula $(ER^*_2)_x$, $B(NR^{}_2)$, or $B(NR^{}_2)_2$, wherein E is silicon, germanium, tin, or carbon, R* independently each occurrence is hydrogen or a group selected from silyl, hydrocarbyl, hydrocarbyloxy, and combinations thereof, said R* having up to 30 carbon or silicon atoms, R independently each occurrence is a group selected from silyl, hydrocarbyl, and combinations thereof, said R having up to 30 carbon or silicon atoms, and x is 1 to 8. Preferably, R* independently each occurrence is methyl, ethyl, propyl, benzyl, butyl, phenyl, methoxy, ethoxy, or phenoxy, and R** is methyl, ethyl, propyl, benzyl or butyl.

Examples of the complexes containing two Lp groups are compounds corresponding to the formula:

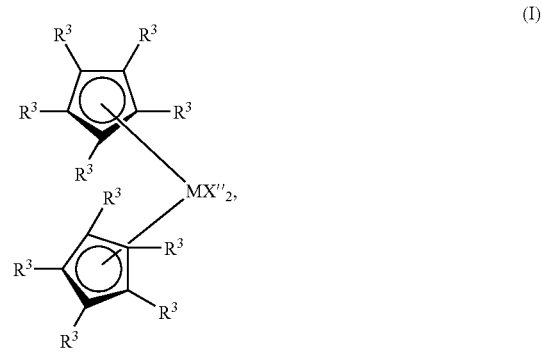

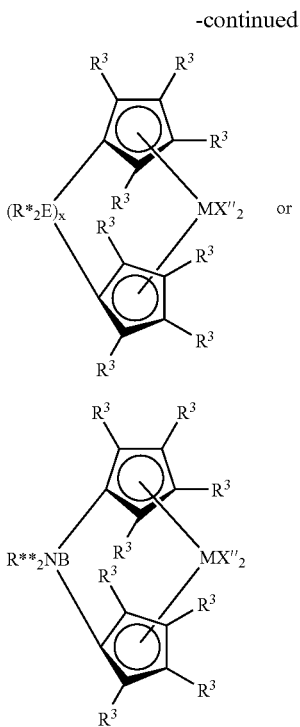

wherein:

M is titanium, zirconium or hafnium, preferably zirconium or hafnium, in the +2 or +4 formal oxidation state; $R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, and X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms forming a π-complex with M, whereupon M is in the +2 formal oxidation state, and R*, R**, E and x are as previously defined, preferably $(ER^*_2)_x$ is dimethylsilandiyl or ethylene, and $BNR^{**}_2$ is di(isopropyl)aminoborandiyl, di(methyl)aminoborandiyl, di(phenyl)aminoborandiyl, di(tolyl)aminoborandiyl.

Exemplary bridged ligands containing two π-bonded groups are: dimethylbis(cyclopentadienyl)silane, dimethylbis(tetramethylcyclopentadienyl)silane, dimethylbis(2-ethylcyclopentadien-1-yl)silane, dimethylbis(2-t-butylcyclopentadien-1-yl)silane, 2,2-bis(tetramethylcyclopentadienyl)propane, dimethylbis(inden-1-yl)silane, dimethylbis(tetrahydroinden-1-yl)silane, dimethylbis(fluoren-1-yl)silane, dimethylbis(tetrahydrofluoren-1-yl)silane, dimethylbis(2-methylphenylinden-1-yl)-silane, dimethylbis(2-methylinden-1-yl)silane, di(isopropyl)aminobis(cyclopentadienyl)borandiyl, di(isopropyl)aminobis(2-methyl-4-phenylinden-1-yl)-borandiyl, di(isopropyl)aminobis(2-methylinden-1-yl)borandiyl, dimethyl(cyclopentadienyl)(fluoren-1-yl)silane, dimethyl(cyclopentadienyl)(octahydrofluoren-1-yl)silane, dimethyl(cyclopentadienyl)(tetrahydrofluoren-1-yl)silane, (1,1,2,2-tetramethyl)-1,2-bis(cyclopentadienyl)disilane, (1,2-bis(cyclopentadienyl)ethane, and dimethyl(cyclopentadienyl)-1-(fluoren-1-yl)methane.

Preferred X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups.

A further class of metal complexes utilized in the present invention corresponds to the preceding formula $Lp_lMX_mX'_nX''_p$, or a dimer thereof, wherein X is a divalent group of up to 50 non-hydrogen atoms that together with Lp forms a metallocycle with M.

Preferred divalent X groups include groups containing up to 30 non-hydrogen atoms comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur that is covalently bonded to M.

A preferred class of such Group 4 metal coordination complexes used according to the present invention corresponds to the formula:

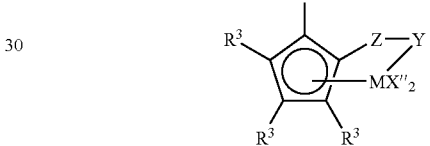

wherein:

M is titanium or zirconium, preferably titanium in the +2, +3, or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, each X" is a halo, hydrocarbyl, hydrocarbyloxy or silyl group, said group having up to 20 non-hydrogen atoms, or two X" groups together form a neutral $C_{5-30}$ conjugated diene or a divalent derivative thereof; Y is —O—, —S—, —NR*—, —PR*—; and Z is $SiR^*_2$, $CR^*_2$, $SiR^*_2SiR^*_2$, $CR^*_2CR^*_2$, $CR^*=CR^*$, $CR^*_2SiR^*_2$, $GeR^*_2$, or $B(NR^{**}_2)$ wherein R* and R** are as previously defined.

Highly preferred metal complexes for use herein are the following metal complexes:
dimethylsilanebis(inden-1-yl)zirconium dimethyl,
dimethylsilanebis(inden-1-yl)zirconium(II) 1,3-pentadiene,
dimethylsilanebis(inden-1-yl)zirconium(II) 1,4-diphenyl-1,3-butadiene,
dimethylsilanebis(2-methyl-4-phenylinden-1-yl)zirconium dimethyl,
dimethylsilanebis(2-methyl-4-phenylinden-1-yl)zirconium (II) 1,3-pentadiene, and
dimethylsilanebis(2-methyl-4-phenylinden-1-yl)zirconium (II) 1,4 diphenyl-1,3-butadiene.

Further highly preferred metal complexes for use herein include the following: (tert-butylamido) dimethyl(tetramethyl-$\eta^5$-cyclopentadienyl)silane zirconium dimethyl; (tert-butylamido)(dimethyl)(tetramethyl-$\eta^5$-cyclopentadienyl)silanezirconium dimethyl; (tert-butylamido)(tetramethyl-$\eta^5$-cyclopentadienyl)dimethylsilanetitanium s-trans-$\eta^4$-1,4-diphenyl-1,3-butadiene; (tert-butylamido)(tetramethyl-$\eta^5$-cyclopentadienyl)dimethylsilanetitanium s-trans-$\eta^4$-2,4-hexadiene; (tert-butylamido)(tetramethyl-$\eta^5$-cyclopentadienyl)dimethylsilanetitanium s-trans-$\eta^4$-1,3-pentadiene; (phenylamido)(tetramethyl-$\eta^5$-cyclopentadienyl)dimethylsilanetitanium s-trans-$\eta^4$-1,4diphenyl-1,3-butadiene; (phenylamido)(tetramethyl-$\eta^5$-cyclopentadienyl)dimethylsilanetitanium s-trans-$\eta^4$-2,4-hexadiene; (phenylamido)(tetramethyl-$\eta^5$-cyclopentadienyl)dimethylsilanetitanium s-trans-$\eta^4$-3-methyl-1,3-pentadiene; (phenylamido)(tetramethyl-$\eta^5$-cyclopentadienyl)dimethylsilanetitanium s-trans-$\eta^4$-1,3-pentadiene; (benzylamido)($\eta^5$-indenyl)dimethylsilanetitanium s-trans-$\eta^4$-1,4-diphenyl-1,3-butadiene; (benzylamido)($\eta^5$-fluorenyl)dimethylsilanetitanium s-trans-$\eta^4$-1,4-dibenzyl-1,3-butadiene; (benzylamido)($\eta^5$-indenyl)dimethylsilanetitanium s-trans-$\eta^4$-2,4-hexadiene; (benzylamido)(t-butyl-$\eta^5$-cyclopentadienyl)dimethylsilanetitanium s-trans-$\eta^4$-1,3-pentadiene; (benzylamido)($\eta^5$-indenyl)dimethylsilanetitanium s-trans-$\eta^4$-1,4-bis(trimethylsilyl)-1,3-butadiene.

In the process of the present invention, the above-mentioned catalyst compounds and complexes preferably are rendered catalytically active by combination with an activating cocatalyst or use of an activating technique, such as those that are previously known in the art for use with transition metal olefin polymerization complexes. Suitable activating cocatalysts for use herein include polymeric or oligomeric alumoxanes, especially methylalumoxane, triisobutyl aluminum modified methylalumoxane, or isobutylalumoxane; neutral Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluorophenyl)borane; nonpolymeric, compatible, noncoordinating, ion forming compounds (including the use of such compounds under oxidizing conditions), especially the use of ammonium-, phosphonium-, oxonium-, carbonium-, sylium- or sulfonium- salts of compatible, noncoordinating anions, or ferrocenium salts of compatible, noncoordinating anions; bulk electrolysis (explained in more detail hereinafter); and combinations of the foregoing activating cocatalysts and techniques. A preferred ion forming compound is a tri($C_{1-20}$-hydrocarbyl)ammonium salt of a tetrakis(substituted aryl)borate, especially a tetrakis(pentafluorophenyl)borate. The foregoing activating cocatalysts and activating techniques have been previously taught with respect to different metal complexes in the following references: EP-A-277,003, U.S. Pat. Nos. 5,153,157, 5,064,802, 5,321,106, 5,721,185, 5,350,723, 5,470,993, 5,425,872, 5,625,087, 5,883,204, 5,919,983, 5,783,512, WO 96/28480, WO 99/15534, and WO99/42467.

Combinations of neutral Lewis acids, especially the combination of a trialkylaluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris (pentafluorophenyl)borane with a polymeric or oligomeric alumoxane are especially desirable activating cocatalysts. Preferred molar ratios of Group 4 metal complex:tris(pentafluoro-phenyl)borane:alumoxane are from 1:1:1 to 1:10:30, more preferably from 1:1:1.5 to 1:5:10.

The molar ratio of catalyst/cocatalyst employed preferably ranges from 1:10,000 to 100:1, more preferably from 1:5000 to 10:1, most preferably from 1:1000 to 1:1. Alumoxane, when used by itself as an activating cocatalyst, is employed in large quantity, generally at least 100 times the quantity of metal complex on a molar basis. Tris(pentafluorophenyl)borane, where used as an activating cocatalyst is employed in a molar ratio to the metal complex of form 0.5:1 to 10:1, more preferably from 1:1 to 6:1 most preferably from 1:1 to 5:1. The remaining activating cocatalysts are generally employed in approximately equimolar quantity with the metal complex.

Preferred types of high efficiency Ziegler-Natta catalysts for use in manufacturing the copolymers of the invention are those that are useful at relatively high polymerization temperatures. Examples of such catalyst compositions are those derived from organomagnesium compounds, alkyl halides or aluminum halides or hydrogen chloride as a halide source, and a transition metal compound. Examples of such catalysts are described in U.S. Pat No. 4,314,912 (Lowery, Jr. et al.), U.S. Pat. No. 4,547,475 (Glass et al.), and U.S. Pat. No. 4,612,300 (Coleman, III), the disclosures of which are incorporated herein by reference.

The catalyst composition described in U.S. Pat. Nos. 4,314,912 and 4,547,475 comprises the product which results from combining (A) a magnesium halide prepared by contacting (1) at least one hydrocarbon soluble magnesium component represented by the general formula $R_2Mg.xAlR'_3$ and (2) at least one non-metallic or metallic halide source; (B) at least one transition metal compound represented by the formula $Tm(OR)_y X_{y-x}$ wherein Tm is a transition metal of Groups 4-12 of the Periodic Table; R is a hydrocarbyl group having from 1 to about 20 carbon atoms, X is a halide or hydrocarbyloxide, x and y each independently have values from zero up to the valence of Tm and x+y has a value equal to the valence of Tm; (C) optionally an additional halide source; (D) optionally an organoaluminum compound. Preferably, the amount of halide added is sufficient to convert the R groups attached to a magnesium atom in component (A) to a halide.

Particularly suitable organomagnesium compounds include, for example, hydrocarbon soluble dihydrocarbylmagnesium such as the magnesium dialkyls and the magnesium diaryls. Exemplary suitable magnesium dialkyls include particularly n-butyl-sec-butylmagnesium, diisopropylmagnesium, di-n-hexylmagnesium, isopropyl-n-butylmagnesium, ethyl-n-hexylmagnesium, ethyl-n-butylmagnesium, di-n-octylmagnesium and others wherein the alkyl has from 1 to 20 carbon atoms. Exemplary suitable magnesium diaryls include diphenylmagnesium, dibenzylmagnesium and ditolylmagnesium. Suitable organomagnesium compounds include alkyl and aryl magnesium alkoxides and aryloxides and aryl and alkyl magnesium halides with the halogen-free organomagnesium compounds being more desirable.

Among the halide sources which can be employed herein are the active non-metallic halides and metallic halides.

Suitable non-metallic halides are represented by the formula R'X wherein R' is hydrogen or an active monovalent organic radical and X is a halogen. Particularly suitable non-metallic halides include, for example, hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active as defined hereinbefore are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, alpha-phenylethyl bromide, diphenyl methyl chloride and the like. Most preferred are hydrogen chloride, t-butyl chloride, allyl chloride and benzyl chloride.

Suitable metallic halides which can be employed herein include those represented by the formula $MR_{y-a}X_a$ wherein M is a metal of Groups IIB, IIIA or IVA of Mendeleev's Periodic Table of Elements, R is a monovalent organic radical, X is a halogen, Y has a value corresponding to the valence of M and a has a value from 1 to y. Preferred metallic halides are aluminum halides of the formula $AlR_{3-a}X_a$ wherein each R is independently hydrocarbyl as hereinbefore defined such as alkyl, X is a halogen and a is a number from 1 to 3. Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

Suitable transition metal compounds include titanium compounds, for example, tetraethoxy titanium, tetraisopropoxy titanium, tetra-n-butoxy titanium, tetraphenoxy titanium, tetra-n-propoxy titanium, tetra-(2-ethylhexoxy)titanium, di-n-butoxy titanium dichloride, titanium tetrachloride, mixtures thereof and the like. Suitable vanadium compounds which can be employed herein include, for example, vanadium oxytrichloride, vanadium oxytriisopropoxide, vanadium tetrachloride, mixtures thereof and the like.

A further method to prepare a Ziegler-Natta catalyst suitable for making the polymers of the present invention is described in U.S. Pat. No. 4,612,300 the disclosure of which is incorporated herein by reference, e.g. Example P. The described method involves firstly preparing a slurry of anhydrous magnesium chloride in Isopar® E hydrocarbon by passing anhydrous electronic grade HCl through a solution of dibutyl magnesium in Isopar® E until all the magnesium alkyl has been converted to magnesium chloride and stripping the excess HCl with $N_2$ to obtain a 0.2 molar suspension of magnesium chloride in Isopar® E; and secondly, sequentially adding to a volume of Isopar® E hydrocarbon, the slurry of anhydrous magnesium chloride in Isopar® E hydrocarbon, a solution of $EtAlCl_2$ in n-hexane, and a solution of $Ti(O-iPr)_4$ in Isopar® E hydrocarbon, to yield a slurry containing a magnesium concentration of 0.166 M and a ratio of Mg/Al/Ti of 40.0:12.5:3.0. The slurry thus obtained is combined with an aluminum alkyl compound cocatalyst to provide a highly efficient catalyst. For example, an aliquot of this slurry and a dilute solution of $Et_3Al$ are independently pumped in two separate streams and combined immediately prior to introduction into a polymerization reactor system to give an active catalyst with a final Al:Ti molar ratio of preferably 1 to 30, more preferably 3 to 7.

In performing the copolymerization, the amount of the titanium catalyst used is, for example, about 0.0005 to about 1 millimole/liter, preferably about 0.001 to about 0.1 mole/liter, calculated as titanium atom. The amount of the organoaluminum cocatalyst compound is that which serves to maintain polymerization activity. Desirably, it is used so that the Al/Ti atomic ratio becomes from about 1 to about 2,000, preferably from about 10 to about 500.

The polymerization may be carried out continuously or batchwise, preferably continuously. The polymerization may be carried out in one or two or more polymerization reactors under different conditions. In the process of the present invention consecutive or parallel polymerization steps may be carried out in subsequent or parallel polymerization zones, each employing the same or a different type of catalyst. Fresh catalyst, may be added to a second reactor but is not necessary.

The reactor feed composition typically has a solvent to ethylene weight ratio of 3 to 10, and more preferably 3.5 to 6. The comonomer to ethylene weight ratio is typically in the range of 0.1 to 1.0, preferably 0.2 to 0.8.

Typically the copolymers of this invention contain additives, stabilizers, such as heat stabilizers, weathering stabilizers, antioxidants, LV-absorbers, antistatic agents, antiblocking agents, slip agents, lubricants, nucleating agents, pigments, dyes and inorganic or organic fillers.

Exemplary stabilizers are phenolic stabilizers, organic phosphite stabilizers, thioether stabilizer, hindered amine stabilizer, and metal salt of higher aliphatic acid stabilizer. Examples of anti-oxidant additives may include BHT; Ionox 330 (Shell Co.); Goodrite 3114 (Goodrich Co.); Irganox 1010, 1076, Irgafos 168, Tinuvin 327 (Ciba-Geigy Co.); Weston 618 (Borgwarner Co.); LS 770, LS 622 (Sankyo Co.).

The additive can be added at the end of a polymerization step, during extrusion of the copolymer in the finishing step, if any, or in separate blending or additive addition steps.

A further embodiment of the present invention is a polymer composition comprising a copolymer according to the present invention as described above in general and in its preferred embodiments.

The polymer composition of the present invention comprises the copolymers of the present invention blended with other natural or synthetic polymers. Examples of thermoplastic resins suitable for blending with the current copolymers include polyolefins, for example, high-density polyethylene, medium-density polyethylene, polypropylene, poly(1-butene), poly(4methyl-1-pentene), low-crystalline to non-crystalline copolymers of ethylene and propylene or 1-butene and propylene-1-butene copolymers. Other suitable blend components are styrene polymers such as polystyrene, poly(.alpha.-methylstyrene), acrylonitrile/styrene copolymer and acrylonitrile/butadiene/styrene copolymer, polyesters such as polyethylene terephthalate and polybutylene terephthalate, polyamides such as polycaprolactoate, polyhexamethylene adipamide, polyhexamethylene sebacamide and polydecamethylene adipamide, polyarylene oxides such as poly(2,6-dimethylphenylene oxide), polyoxymethylene and polycarbonate. The polymer composition desirably contains the usual additives, such as those additives mentioned above in relation to the present copolymers.

Yet another embodiment of the present invention is an article of manufacture which comprises a copolymer according to the present invention as described above in general and in its preferred embodiments, or comprises a polymer composition of the present invention.

The present copolymers of ethylene and heptene-I are excellent in puncture resistance, and have, good values of impact resistance, tear resistance, and optical properties such as gloss, haze and clarity so that the copolymers are suitable for use in the preparation of articles of manufacture such as films. Films include blown or cast films in monolayer, multilayer or laminated constructions formed by extrusion, extrusion-coating on other film or sheet, coextrusion, or by lamination. Such films are useful as shrink film, cling film, stretch film, sealing films, oriented films, freezer films, snack packaging, heavy duty bags, grocery sacks, baked and frozen food packaging, medical packaging, industrial liners, can liners, shipping sacks, trash can liners, diaper backsheets, produce bags, laminating films, membranes, such as geomembranes, etc. in food-contact and nonfood contact applications and agricultural and greenhouse films. The films of the present invention are particular suitable for packaging films, for example for medical applications, food packaging or food display. The films of the present invention are also suitable for heavy duty packaging applications by virtue of their particular properties. In addition to being used as packaging film materials, the copolymers can be processed into various molded articles such as containers, articles for daily use, pipes and tubes by T-die molding, inflation molding, blow molding, injection molding and extrusion. Further, the copolymers can be extrusion-coated on other film or sheet or co-extruded together with other film or sheet to prepare various composite films or laminated structures. Furthermore, the copolymers can be used in the fields of steel pipe coating materials, wire coating materials and expansion-molded articles.

The invention is further illustrated by means of the following examples.

EXAMPLES

Example 1

1-Heptene Production 1-heptene was produced by a gas-phase dehydration of 1-heptanol. The catalyst used for this reaction was a delta alumina catalyst obtained from Sued Chemie (CS-331-5 CDS, 1/16 inch extrudates). The heptanol dehydration reaction was carried out in a continuous laboratory unit. 1-heptanol was first fed via an HPLC-pump to a preheater, in which the 1-heptanol was vaporized and then fed to a tubular reactor containing a charge of alumina catalyst. Nitrogen was added to the 1-heptanol feed as a diluent to facilitate the evaporation of the 1-heptanol in the catalyst bed. The outlet of the reactor was cooled to ambient temperature with cooling water and the reaction product was collected in collecting drum.

The crude reaction product consisted of heptene, heptanol, di-heptyl ether and water. In a first purification step the water phase was separated from the organic phase in a continuous distillation in a column with 50-55 theoretical trays, operated at a pressure of 1014 mbar. The purified 1-heptene was taken as a sidestream from the column. In a second purification step the side stream was treated with mol sieves 13× and Selexsorb CD (5 kg/200 L) and during which the product stream was purged with $N_2$ to avoid contamination with air. The chemical composition of the 1-heptene after the second purification step is listed in Table 1.

TABLE 1

The chemical composition of 1-heptene.

| Compound | Content weight percent |
|---|---|
| 1-heptene | 97.6% |
| trans 2-heptene | 0.9% |
| cis 2-heptene | 1.4% |
| Heptane | 0.2% |
| Water | 3 ppm |
| Carbonyls | 7 ppm |
| peroxide (as H2O2) | 2 ppm |

Production of the Copolymer

Example 2

Preparation of Copolymer of Ethylene and 1-heptene

The copolymerization of ethylene and 1-heptene was carried out in two continuous stirred tank reactors (CSTR's) of 5 liters each in volume, which were agitated and operated in series. The reactors were each equipped with a shell to keep the reactor contents at adiabatic conditions. The feed to the first reactor comprised an $C_{7-8}$ n-alkane mixture solvent with a boiling range of 100° C. to 140° C. at 31 kg/hr, and ethylene corresponding to 13 weight percent of the total solvent stream, compressed and dissolved in the solvent stream prior to reactor entry. The temperature of the solvent/ethylene feed is 15° C. at a pressure of 35 bar. 1-heptene was added as a separate stream into the first reactor. Via a separate stream a Ziegler type catalyst suspension in the same n-alkane mixture as described above was injected into the first reactor at a rate of about 0.01 g Ti/hr. The catalyst was prepared essentially according to the procedure as described in example 7 of U.S. Pat. No. 4,547,475 and contained Mg/Cl/Al/Ti in the mole ratios 13/35/4/1. Together with the catalyst, triethylaluminum was fed in an amount of about 4 mole of Al per mole of Ti. During the subsequent polymerization of the mixture of ethylene and 1-heptene, 86% of the ethylene was converted and the reactor temperature increased to about 170° C. The dissolved polymer entered into the second reactor where another 5% ethylene was converted, which increased the reaction temperature to 195° C. at a pressure of 35 bar. About 5.2 kg polymer per hour was so formed having a melt index of 1 and a density of 920 kg/m³ and containing about 10 weight percent of heptene.

After the product stream containing polymer, monomer, solvent and catalyst left the second reactor, calcium stearate (1200 ppm) and the antioxidants Irgafos 168 (1200 ppm) and Irganox 1076 (300 ppm), based on the polymer loading, were added to the polymer stream.

The polymer stream comprising polymer, solvent, ethylene, 1-heptene, catalyst and additive composition, was heated to 250° C. at 35 bar and devolatilized in a series of two flash vessels. Subsequently, the molten polymer stream then passed through a melt forming die and cutter, and was cooled to give solid pellets. A total of about 25 kg polymer was produced.

Example 3

Preparation of Colpolymer or Ethylene and 1-heptene

Copolymerization of ethylene and 1-heptene was carried out according to the procedure described in Example 2 using one reactor instead of two by bypassing the second reactor. The catalyst composition was prepared essentially according to the procedure as described in Example 26 of U.S. Pat. No. 5,470,993, wherein the titanium component was added to the reactor at a rate of about $5 \cdot 10^{-3}$ g Ti/hr. Simultaneously, $B(C_6F_5)_3$ and type 3A modified methylalumoxane, available from AkzoNobel, Arnhem, The Netherlands, were added to the reactor to provide a Ti/B/Al molar ratio of 1:3:1. The production conditions are listed in Table 2. A total of about 25 kg polymer was produced.

Example 4

Preparation of Copolymer or Ethylene and 1-heptene

Copolymerization of ethylene and 1-heptene was carried out according to the procedure described in Example 2 using a catalyst prepared in essentially the same way as in Example 2 and containing Mg/Cl/Al/Ti in the mole ratios 31/82/10/1. The production conditions are listed in Table 2. A total of about 25 kg polymer was produced.

TABLE 2

Production conditions for the Copolymers of Ethylene and 1-Heptene.

| | Example 2 | Example 3 | Example 4 |
|---|---|---|---|
| Conditions Reactor 1: | | | |
| Solvent feed (kg/h) | 31.0 | 34.0 | 25.0 |
| Ethylene feed (kg/h) | 4.80 | 3.96 | 4.12 |
| 1-Heptene feed (kg/h) | 2.55 | 1.20 | 2.30 |
| $H_2$ feed (SmL/min)* | 86 | 18.5 | 56.0 |
| Temperature (° C.) | 168 | 109 | 163.5 |
| Conversion (%) | 86.3 | 86.0 | 87.9 |
| Conditions Reactor 2: | | — | |
| Solvent feed (kg/h) | 3.0 | | 8.0 |
| Temperature (° C.) | 195 | | 185 |
| Total Conversion (%) | 91.4 | | 92.4 |

*SmL/min is the volume of gas in standard millilitres per minute at 1 bar and 25° C.

Polymer Characterization

The physical properties of the materials and films of the present invention obtained in Examples 2-4 are shown in table 4, together with the properties of films prepared in the same way from several commercially available polymers.

The following commercial ethylene copolymers were used:

Lupolex 18 KFA available from Basell, Hoofddorp, the Netherlands.

Polimeri Clearflex FG 166 and Clearflex LF 208 available from Polimeri, Milan, Italy.

ExxonMobil Exceed 1012 CA available from Exxon Mobil, Irving, Tex., USA.

Equistar Pethrothene GA 501020 available from Equistar, Houston, Tex., USA.

Nova Sclair FP 120 available from Nova Chemicals, Calgary, Canada.

The copolymers produced were characterized by the following tests.

The melt index MI was determined according to ASTM-D-1238 Procedure A, Condition E at 190° C./2.16 kg on compression molded plaques.

The density D of the olefin polymers was determined by the displacement method employing the Archimedes principle as described in ASTM-D-792. The solvent used was iso-propyl alcohol.

The Fraction CFW was determined using crystallization analysis fraction as described above.

Peak force at break per millimeter of film thickness P was determined according to the procedure described above.

The dart drop impact has been measured according to the procedure described in ISO 7765 method A, unless stated otherwise.

Elmendorf tear has been measured on a Thwing-Alberts Instruments Protear Elmendorf Tearing tester according to the procedure described in ISO-6383-2/ASTM-D-1922.

Gloss 45° has been determined according to the procedure described in ASTM-D-2457 using a Gardner micro-gloss 45° glossmeter.

Haze and clarity have been measured using a Gardner Haze Gard Plus according to the method described in ASTM-D-1003 and ASTM-D-1746, respectively.

The method of blowing the 50 micrometer thick blown film was carried out as described above. The film extrusion conditions are further described in Table 3.

TABLE 3

Film Extrusion Conditions.

| | Example 2 | Example 3 | Example 4 | Basell Lupolex 18 KFA | Polimeri Clearflex FG 166 | Exxon Exceed 1012 CA | Equistar Pethrothene GA 501020 | Nova Sclair FP 120 | Polimeri Clearflex LF 208 |
|---|---|---|---|---|---|---|---|---|---|
| Die temp.(° C.) | 215 | 215 | 215 | 215 | 213 | 213 | 213 | 215 | 213 |
| Melt temp. (° C.) | 246 | 228 | 226 | 248 | 247 | 251 | 247 | 245 | 246 |
| Screw speed (rpm) | 38 | 32 | 40 | 40 | 40 | 40 | 40 | 40 | 40 |
| Melt pressure (MPa) | 285 | 230 | 261 | 277 | 274 | 272 | 272 | 226 | 245 |
| Torque (Nm) | 585 | 670 | 560 | 600 | 595 | 660 | 580 | 545 | 575 |
| Haul-off (m/min) | 0.5 | 0.6 | 0.6 | <0.6 | 0.5 | 0.5 | 0.6 | <0.6 | 0.5 |
| Output (kg/hr) | 11.5 | n.d. | n.d. | 12.1 | 12.1 | 12.4 | 12.1 | 12.3 | 12.2 |

TABLE 4

| Property | Example 2 | Example 3 | Example 4 | Basell Lupolex 18 KFA | Polimeri Clearflex FG 166 | Exxon Exceed 1012 CA | Equistar Pethrothene GA 501020 | Nova Sclair FP 120 | Polimeri Clearflex LF 208 |
|---|---|---|---|---|---|---|---|---|---|
| Comonomer | 1-heptene | 1-heptene | 1-heptene | 1-butene | 1-hexene | 1-hexene | 1-hexene | 1-octene | 1-octene/1-butene |
| Type of polymerization process | Solution | Solution | Solution | Gas-phase | Gas-phase | Gas-phase | Gas-phase | Solution | Solution |
| Density (kg/m$^3$) | 920.6 | 904.2 | 918.2 | 918.4 | 916.8 | 911.2 | 918.6 | 922.8 | 918.5 |
| MI (g/10 min) | 1.20 | 1.04 | 0.92 | 1.05 | 0.90 | 1.09 | 1.04 | 0.88 | 0.79 |
| CFW | 0.355 | 0.003 | 0.207 | 0.248 | 0.389 | 0.074 | 0.255 | 0.227 | 0.253 |
| C | 593.8 | 901.5 | 728.1 | 690.6 | 560.2 | 843.8 | 684.4 | 713.3 | 686.1 |
| 1.9 C - 127 | 1001 | 1586 | 1256 | 1185 | 937 | 1476 | 1173 | 1228 | 1177 |
| 2.7 C - 563 | 1040 | 1871 | 1403 | 1302 | 950 | 1715 | 1285 | 1363 | 1289 |
| 3.4 C - 944 | 1074 | 2121 | 1532 | 1404 | 961 | 1925 | 1383 | 1481 | 1389 |
| P (N/mm) | 1110 ± 110 | 2403 ± 85 | 1684 ± 139 | 1073 ± 111 | 821 ± 116 | 1021 ± 162 | 825 ± 121 | 972 ± 96 | 862 ± 66 |
| Dart drop impact (g) | 469 ± 51 | 481 ± 50* | 557 ± 176 | 195 ± 13 | 477 ± 27 | >996* | 183 ± 9 | 549 ± 43 | 413 ± 93 |
| Elmendorf tear (g) | | | | | | | | | |
| Machine direction | 995 ± 64 | 578 ± 53 | 1051 ± 106 | 326 ± 20 | 859 ± 51 | 611 ± 34 | 280 ± 20 | 760 ± 79 | 825 ± 135 |
| Cross direction | 1101 ± 75 | 713 ± 63 | 1104 ± 52 | 531 ± 13 | 1194 ± 33 | 735 ± 28 | 566 ± 15 | 1110 ± 14 | 988 ± 29 |
| Gloss 45° (gloss units) | 47.7 ± 0.2 | 80 ± 2 | 70.4 ± 1.2 | 44 ± 5 | 46 ± 2 | 58 ± 3 | 53 ± 2 | 48 ± 5 | 58 ± 2 |
| Haze (%) | 15.7 ± 1.1 | 2.1 ± 0.2 | 7.2 ± 0.7 | 16.6 ± 1.3 | 16.8 ± 0.9 | 11.9 ± 1.8 | 13.1 ± 0.8 | 18 ± 5 | 21 ± 6 |
| Clarity (%) | 98.2 ± 0.2 | 97.5 ± 0.4 | 99.3 ± 0.1 | 98.2 ± 0.2 | 98.7 ± 0.2 | 95.9 ± 0.9 | 99.0 ± 0.1 | 91.5 ± 1.7 | 97.8 ± 1.1 |

*Dart drop impact measured according to ISO 7765-1B.

What is claimed is:

1. A copolymer comprising units derived from ethylene and 1-heptene wherein the peak force at break per millimeter of film thickness P of a blown film made of the copolymer satisfies the following relationship:

$$P > 1.9C - 127 \quad (1)$$

wherein P is expressed in N/mm and determined on a 50 micrometer thick blown film according to ASTM-D5748-95; and C is given by the relationship C=D(1−CFW), wherein D is the density of the copolymer measured in kg/m$^3$ according to ASTM-D-792 and CFW is the weight fraction of the copolymer having a crystallization point of 75° C. or higher as determined using crystallization analysis fractionation, and C is greater than or equal to 550.

2. The copolymer of claim 1 wherein P satisfies the following relationship:

$$P > 2.7C - 563 \quad (1a)$$

wherein P and C have the same meanings as in formula 1 in claim 1.

3. The copolymer of claims 1 wherein P satisfies the following relationships:

$$P > 3.4C - 944 \quad (1b)$$

wherein P and C have the same meanings as in formula 1 in claim 1.

4. A copolymer according to any of the claims 1-3 wherein the density D is from 890 to 935 kg/M$^3$ and the melt index as measured according to ASTM-D-1238 Procedure A, Condition E at 190° C./2.16 kg is from 0.3 to 25 g/10 min.

5. A copolymer according to claim 4 wherein the density D is from 895 to 930 kg/m$^3$.

6. A copolymer according to claim 5 wherein the density D is from 901 to 928 kg/m$^3$.

7. A copolymer according to claim 4 wherein the melt index is from 0.5 to 10 g/10 min.

8. A copolymer according to any of the claims 1-3 wherein the fraction CFW is from 0 to 0.5.

9. A composition comprising a copolymer of any of the claims 1-3.

10. An article prepared from or containing a copolymer of any of the claims 1-3.

11. An article of claim 10 which is a film.

12. An article of claim 11 which is a packaging film.

* * * * *